United States Patent [19]
Spear

[11] Patent Number: 5,880,461
[45] Date of Patent: Mar. 9, 1999

[54] LOW NOISE OPTICAL POSITION SENSOR

[75] Inventor: Jonathan David Spear, Berkeley, Calif.

[73] Assignee: The Regents of The University of California, Oakland, Calif.

[21] Appl. No.: 755,076

[22] Filed: Nov. 22, 1996

Related U.S. Application Data

[60] Provisional application No. 60/021,680 Jun. 12, 1996.
[51] Int. Cl.⁶ .................................................. G01J 1/42
[52] U.S. Cl. ..................................... 250/208.2; 396/112
[58] Field of Search .............................. 250/208.2, 214 P, 250/214.1, 214 R; 396/112, 111, 89

[56] References Cited

U.S. PATENT DOCUMENTS

| | | | |
|---|---|---|---|
| 4,039,824 | 8/1977 | Nanba | 250/214 P |
| 4,209,241 | 6/1980 | Nanba et al. | 396/110 |
| 4,408,853 | 10/1983 | Tokutomi et al. | 396/112 |

Primary Examiner—Edward P. Westin
Assistant Examiner—Kevin Pyo
Attorney, Agent, or Firm—Paul R. Martin; Henry P. Sartorio; David J. Aston

[57] ABSTRACT

A novel optical position sensor is described that uses two component photodiodes electrically connected in parallel, with opposing polarities. A lens provides optical gain and restricts the acceptance angle of the detector. The response of the device to displacements of an optical spot is similar to that of a conventional bi-cell type position sensitive detector. However, the component photodiode design enables simpler electronic amplification with inherently less electrical noise than the bi-cell. Measurements by the sensor of the pointing noise of a focused helium-neon laser as a function of frequency demonstrate high sensitivity and suitability for optical probe beam deflection experiments.

16 Claims, 7 Drawing Sheets

LOW NOISE OPTICAL POSITION SENSOR

This invention was made with U.S. Government support under Contract No. DE-AC03-76SF00098 between the U.S. Department of Energy and the University of California for the operation of Lawrence Berkeley Laboratory. The U.S. Government may have certain rights in this invention. This invention is disclosed in provisional application Ser. No. 60/021,680 and this application claims benefit of the provisional filing date, Jun. 12, 1996.

I. BACKGROUND OF THE INVENTION

1. Field of the Invention

This invention relates generally to electronic sensors and more specifically to optical position sensors.

2. Description of Related Art

For many years solid state position sensitive detectors have been used to monitor the location of an optical spot that is incident upon the active surface of a device (B. Light, Lasers and Applications 5 (4):75, April 1986). Two types of monolithic photodetectors are commercially available for measuring displacements in one dimension. The lateral effect detector incorporates an electrically resistive layer over the active surface area of a single photodiode, with electrical contacts at either end of the layer (J. T. Wallmark, Proc. IRE 45:474 1957). This type of detector is useful for measuring the centroid of an optical spot that may move across the entire photosensitive area. A second type, called the bi-cell, is sensitive to displacements that are small compared to the size of the optical spot, and commonly is used to monitor perturbations of a probe beam caused by mechanical vibration or optical misalignment. The circuitry of the bi-cell is shown in FIG. 1A. The bi-cell sensitivity is sufficient for use in atomic force microscopy, in which an optical beam is reflected off of the back surface of a small contact probe that is scanned across a solid sample surface [D. Sarid, *Scanning Force Microscopy: with Applications to Electric, Magnetic, and Atomic Forces: Revised Edition*, (Oxford University Press, New York, 1994), Chap. 10, pp. 119–128]. By monitoring the deflection of the beam, it is possible to generate surface topography images with atomic resolution. Position sensitive detectors also are used for observing the "mirage effect," upon which photothermal deflection spectroscopy is based. This is described by W. B. Jackson, N. M. Amer, A. C. Boccara, and D. Fournier, in *Appl. Opt.* 20, 1333 (1981) and by R. E. Russo, F. R. McLarnon, J. D. Spear, and E. J. Cairns, in the *J. Electrochem. Soc.* 134, 2783 (1987). In photothermal deflection spectroscopy, a sample absorbs excitation radiation, producing thermal gradients in or adjacent to the sample. Refractive index gradients accompany the thermal gradients, causing the deflection of an optical probe beam, which is monitored as a measure of radiative absorption. The position sensitive detector reported in this work has been developed specifically for increasing the capability of optical probe beam deflection measurements.

The conventional bi-cell optical position sensor consists of two photodiode segments manufactured from a single piece of doped semiconductor material. Like the lateral detector, the bi-cell uses three electrical leads. One lead is common to both sides of the detector, and the other two provide separate paths for the photocurrent, allowing for discrimination based on position. Both designs require two op-amps for electronic amplification, with feedback resistors R, measured in ohms ($\Omega$), for converting the currents produced by the photodiode segments into measurable voltages [J. G. Graeme, EDN 32:229 Nov. 26, 1987; and J. G. Graeme, *Photodiode Amplifiers: Op Amp Solutions*, (McGraw-Hill, New York, 1996), Chap. 10, pp. 221–243]. FIG. 1A shows the basic circuit for these commercially available sensors. The bi-cell photodiodes 2 and 4 are made as an integrated circuit on a single silicon wafer and thus are immediately adjacent to one another. As a beam moves across the two photodiodes, the amount of light falling on each photodiode 2 and 4 is amplified by an op-amp 6 and 8 and compared. The difference between the op-amp output voltages, ($V_2-V_1$), is taken as a measure of the deflection of the position of the incident optical beam. It is possible also to use the sum of the two op-amp output voltages, ($V_1+V_2$), as a measurement of optical power, for normalization purposes. Under optimal design conditions, the dominant source of electrical output noise, Vn, measured in volts (V), for each op-amp in the circuit is the thermal noise, also sometimes referred to as the Johnson noise, which originates from the feedback resistors 10 and 12 [Noise analysis of FET transimpedance amplifiers, in *The Handbook of Linear IC Applications*, pp. 187–190, Burr-Brown Corp., Tucson (1987)]:

$$V_n = \sqrt{4kTBR} \qquad (1)$$

where k is Boltzmann's constant ($1.38 \times 10^{-23}$ J/K), T is the temperature in degrees Kelvin (K), B is the noise bandwidth in Hertz (Hz), and R is the feedback resistance ($\Omega$). In this type of current-to-voltage amplifier, the value of the feedback resistor R is equal to the gain of the circuit in units of volts per ampere. Therefore, the effective current measurement noise, $i_n$, measured in amps (A), is inversely proportional to the square root of the gain:

$$i_n = \sqrt{4kTB/R} \qquad (2)$$

Equation (2) indicates that maximizing the value of the feedback resistors minimizes electrical noise in a measurement of photocurrents. However, a practical limitation on increasing the value of R is that the output of each op-amp can become saturated. For example, if a conventional position sensitive detector is used to monitor the position of a 2 milliwatt (mW) helium-neon laser beam ($\lambda$=633 nm), and the sensitivity of the detector at this wavelength is 0.33 A/W (typical for silicon photodiodes), then the photocurrent input to each op-amp is equal to 0.33 mA. An op-amp might specify a maximum output voltage of 10 V, which would limit the gain of each op-amp circuit to no more than $3 \times 10^4$ V/A. The amount that the electrical noise can be reduced, simply by increasing R, is thus limited.

Hamamatsu describes using its photodiodes in a light balance detection circuit so that intensity of light having different wavelengths can be balanced (Catalog No. KPD0001E03, page 51). The Hamamatsu circuit does not detect the position of an optical beam and none of the optical design specifications necessary for using the circuit to detect beam position are provided.

Jerry G. Graeme [*Photodiode Amplifiers: Op Amp Solutions*, (McGraw-Hill, New York, 1996), Chap. 10, pp. 221–243] describes a variety of circuits using photodiodes for optical position sensing. His discussion however omits mention of specific designs or problems with noise associated with use of two op amps. For high sensitivity measurements of an optical beam, conventional bicells having the standard two op-amp circuitry are considered to be the best measuring device.

Optical position sensors have in the past been constructed using an electrical component configuration that requires two current amplifiers and one differential voltage amplifier. This configuration introduces unwanted electrical noise into the system. It would be highly desirable to be able to measure the position of an optical spot with less electrical noise than has been possible with currently available circuitry.

II. SUMMARY OF THE INVENTION

It is an object of this invention to provide a position sensitive detector having less electrical noise than has been possible with currently available circuitry. It is a further object of this invention to overcome the practical limitation on signal to noise ratio that is encountered in conventional optical position sensor circuitry and described by equation 2 above.

Unlike a conventional position sensitive detector, the inventive design uses two photodiodes 14 and 16 that are electronically connected in parallel, with opposing polarities. As FIG. 1B illustrates, this arrangement allows one op-amp 18 to be used rather than two. The difference in signal between the 2 photodiodes is amplified by a single opamp. When the beam is incident upon the center of the detector, the photocurrents produced in the two detectors are equal, and the current input to the op-amp is null. Therefore, to reduce the effect of thermal noise, the feedback resistor 20 can be increased to an arbitrarily large value, and op-amp saturation will not occur. This feature of amplifying the difference between two photodiodes that are connected with opposing polarity enables an improvement in signal-to-noise ratio. The circuit was made using component photodiodes. Because of the packaging surrounding the photoresponsive surface area of individual photodiodes, or discrete component photodiodes, an optical beam partitioning element and focusing element are used to align the beam with the photodiodes. The focusing element concentrates the light on the photodiodes so that the smallest possible component photodiodes may be used.

The inventive optical position sensor also comprises a monolithic construction; of two photodiodes connected in parallel, with opposing polarities. An op-amp is connected between the ground and the anode of one of the photodiodes, and a feedback resistor is located in a conventional manner as shown in FIG. 1B.

III. SUMMARY DESCRIPTION OF THE DRAWINGS

IV. DETAILED DESCRIPTION OF THE INVENTION

Figure 1A:
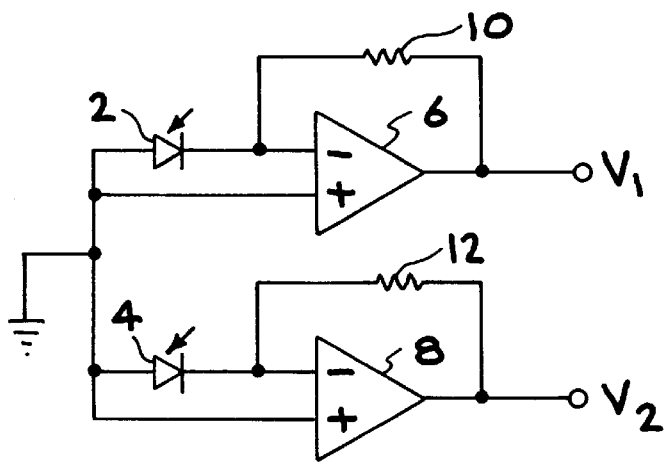
FIG. 1A shows a schematic circuit diagram for the prior art bi-cell detector where the difference between the op-amp voltages, ($V_2-V_1$) provides a measure of the deflection of the optical beam position.
Figure 1B:
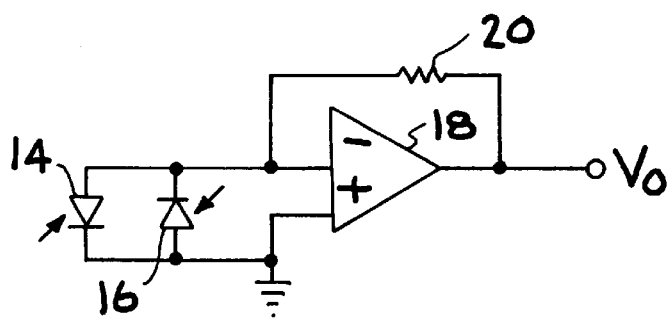
FIG. 1B shows a schematic circuit diagram of the inventive component photodiode optical position sensor where the output voltage, $V_0$ provides a measure of deflection.
Figure 2:
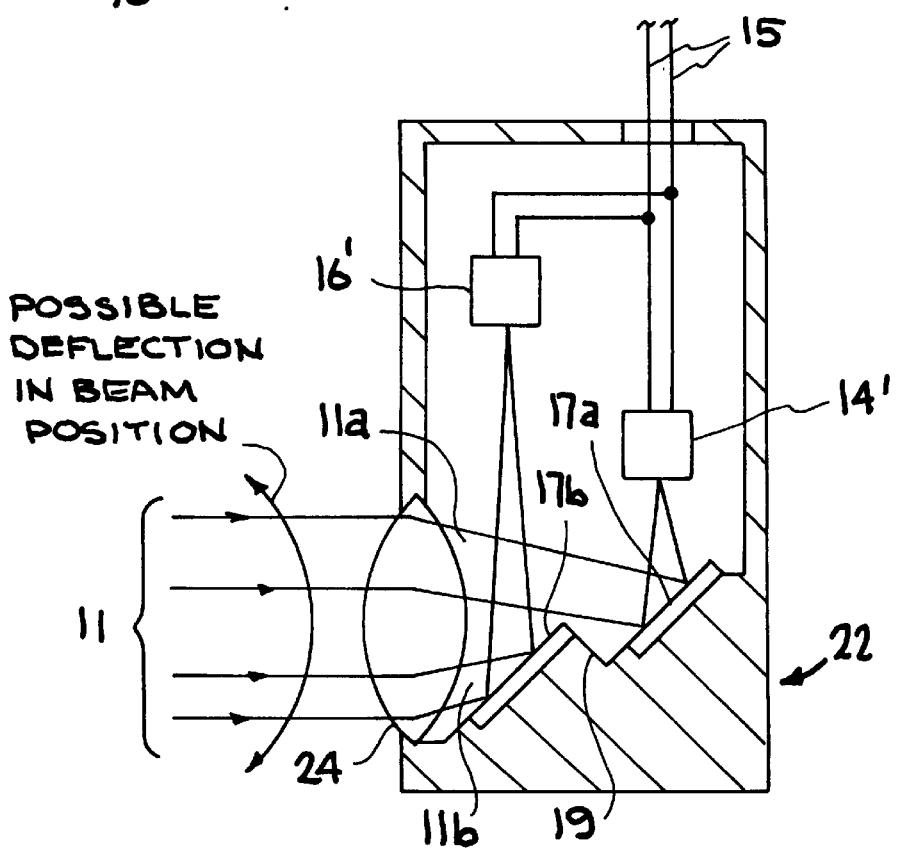
FIG. 2 shows a sketch of the inventive optical position sensor comprising component photodiodes, a focusing element and an optical partitioning element.

FIG. 2 shows a schematic representation of the inventive optoelectronic sensor comprising two component photodiodes 14' and 16', a partitioning element 22, and at least one focusing element 24. The photodiodes are configured so that the anode of the first photodiode is electrically connected to the cathode of the second photodiode (FIG. 1B). FIG. 2 does not illustrate the circuit connections shown in FIG. 1B, but the pair of photodiodes 14' and 16' are connected to an op-amp and feedback resistor as shown in FIG. 1B through electrical leads 15. The partitioning element 22 made up of two flat mirrored surfaces 17a, b seperated and offset by straight edge 19 separates an incident optical beam 11 into at least two of its spatially seperated components, where one component 11a, b is incident on one photodiode and a second component is incident on the second photodiode. The focusing element 24 is located so as to concentrate the two optical beam components on the two photodiodes.

The term "partitioning element" as used in this document means one or more reflective or refractive components that divide an incoming optical beam into two or more of its spatially separted component parts.

The term "component" as used in this document means an electric device such as a photodiode, coil, resistor, or capacitor, having distinct electrical characteristics and having terminals at which it may be connected to other components to form a circuit.

The term "monolithic" as used in this document means an integrated circuit having elements formed in place on or within a semiconductor substrate, with at least one element being formed within the substrate.

A conventional bi-cell photodiode sensor (FIG. 1A) and the inventive component photodiode sensor (FIG. 1B) differ fundamentally in their electrical configuration. The conventional bi-cell position sensor amplifies the signal from each of two photodiodes 2 and 4 which have their cathodes electrically connected. The signal from each photodiode of the bi-cell is amplified by an op-amp 6 and 8 electrically connected to the photodiode. An optical beam position is measured by taking the difference of the two op-amp voltages ($V_2-V_1$). In contrast, the circuit design of the inventive position sensor uses a single op-amp 18. It amplifies the signal coming from two photodiodes 14 and 16 that are electronically connected in parallel with the anode of each connected to the cathode of the other. The single op-amp compares the difference in signal coming from two photodiodes. A feedback resistor 20 can be increased to an arbitrarily large value and op-amp saturation will not occur. This reduces the effect of resistor thermal noise. Thus signal-to-noise ratio is significantly improved.

FIG. 2 presents a schematic diagram of a novel optical position sensor that uses one op-amp and two component photodiodes electrically connected in parallel, with opposing polarities. FIG. 2 does not illustrate the circuit connections shown in FIG. 1B, but the pair of photodiodes 14' and 16' are connected to an op-amp and feedback resistor as shown in FIG. 1B. A focusing element 24, such as a lens, provides optical gain and restricts the acceptance angle of the detector. The focusing element allows the detector design to minimize the size of the photodiodes, which in turn minimizes junction capacitance, having the effect of increasing response speed. Further, impedance is inversely related to surface area, so using small photodiodes results in high shunt resistance maximizing amplifier gain. For example, using photodiodes of about 1.2 mm² reduced junction capacitance to 40 pF and increased shunt resistance to greater than 10 GΩ. The focal length of the focusing element, such as a lens, varies with the nature of the optical beam to be detected, as will be apparent to those of skill in the art. To measure the deflection of a laser beam, the focal length of the focusing element would be between about 3 mm and about 200 mm. Preferably the focal length for this application would be between about 9 mm and about 150 mm. Most preferably, the focal length would be between about 35 mm and about 100 mm. In contrast, if the optical position sensor is used to regulate star trackers, the focal length would be that of a telescope, for example, between about one meter and tens of meters.

The inventive optical position sensor can measure an optical beam diameter that is captured by the diameter of the chosen focusing element 24. It can be seen that a large number of beam diameters can be accommodated by choosing the appropriate focusing optics having a diameter sufficient to capture the optical beam. The power of the beam is limited by photodiode sensitivity on the low end. This occurs where the thermal noise generated by the feedback resistor in the op-amp circuit exceeds the shot noise. The shot noise is given by:

$I_{shotnoise} = (2qI_B)^{1/2}$;
where $q = 1.6 \times 10^{-19}$ coulombs
and $I_B$ = the photocurrent.

The thermal noise is given by:

$I_{thermal\ noise} = (4kT_B/R)^{1/2}$;
where k = Boltzmann's constant
and T = the absolute temperature of the resistor, typically about 300K.

At the point where thermal noise and shot noise are equal, $(2qI_B)^{1/2} = (4kT_r/R)^{1/2}$; or $IR = 2kT/q = 0.052$ Amp-Ω.

Currently, a practical limit for R for commercial amplifiers is $R \sim 10^{10} \Omega$ (Stanford Research Systems Product catalog). Using this value of R in the above equation yields, $I = 0.052$ Amp-$\Omega/10^{10}\Omega = 5 \times 10^{12}$ Amps. If the photodiode sensitivity is 0.33 A/W, then the power level is $P = 1.5 \times 10^{-11}$ W. Photodiodes would still be useful for some optical beam powers less than this value. The lower limit of optical beam power for which current photodiodes would be useful is approximately $1.5 \times 10^{-15}$ W. As photodiode sensitivity improves however, the inventive optical position sensor will be useful with even lower power optical beams.

The inventive sensor is limited at the high end of optical beam power by the capability of the photodiodes to absorb energy from the beam. For easily obtainable photodiodes, this range is between about a tenth of a picowatt and about 5 watts. More easily available photodiodes will respond to beam powers between about 2 picowatts to about 3 watts. Even more easily accommodated are beam powers between about 5 picowatts and about 1 watt.

The partitioning element 22 can be designed in many ways as long as the result is that a parallel beam is divided into at least two of its spatial components. In the examples below, a flat mirror with a straight edge was used (FIG. 2). In another embodiment an unmirrored section of flat glass with a straight edge can be used.

Figure 3A:
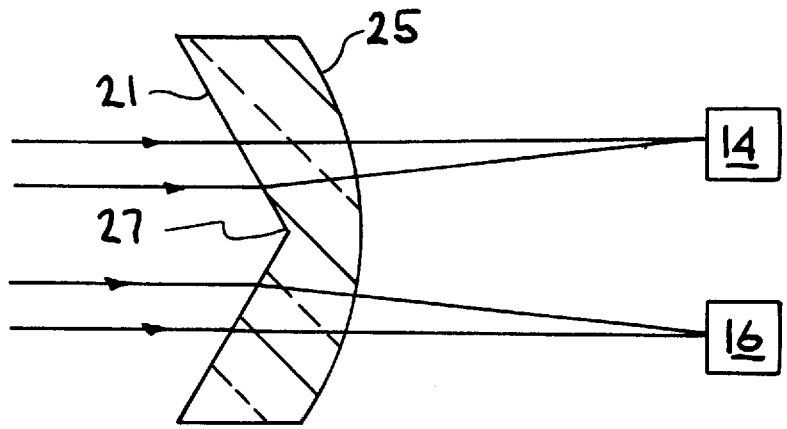
FIG. 3A shows a combined focusing and partitioning element comprising a lens having one face convex and the other face having a "V" groove.
Figure 3B:
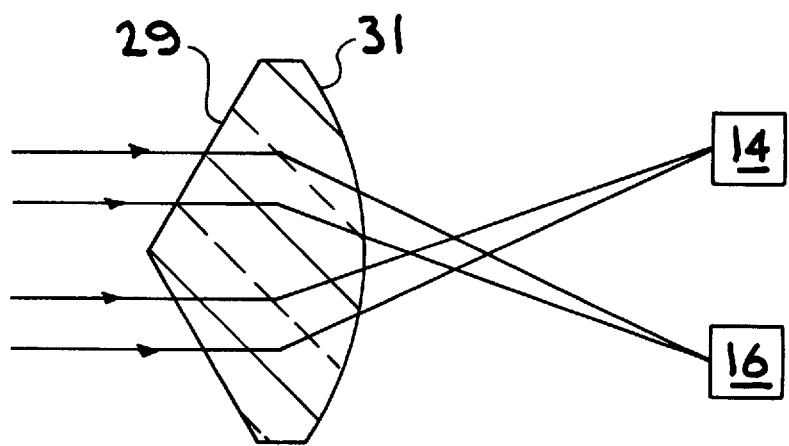
FIG. 3B shows a combined focusing and partitioning element comprising a lens having one face convex and the other face having a "V" ridge.
Figure 3C:
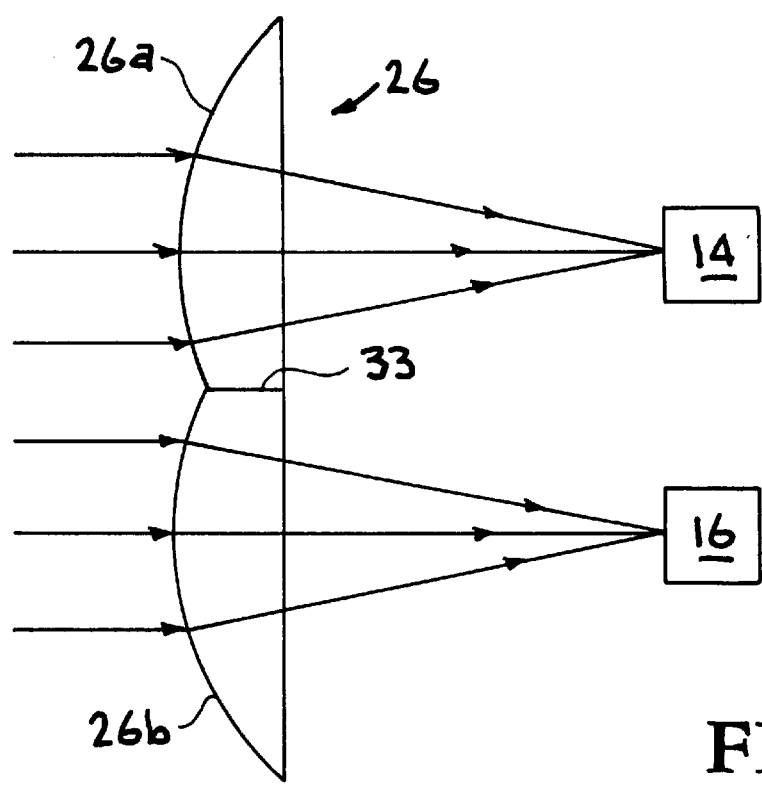
FIG. 3C shows a side view of a combined focusing and partitioning element comprising two plano-convex circular lenses.
Figure 3D:
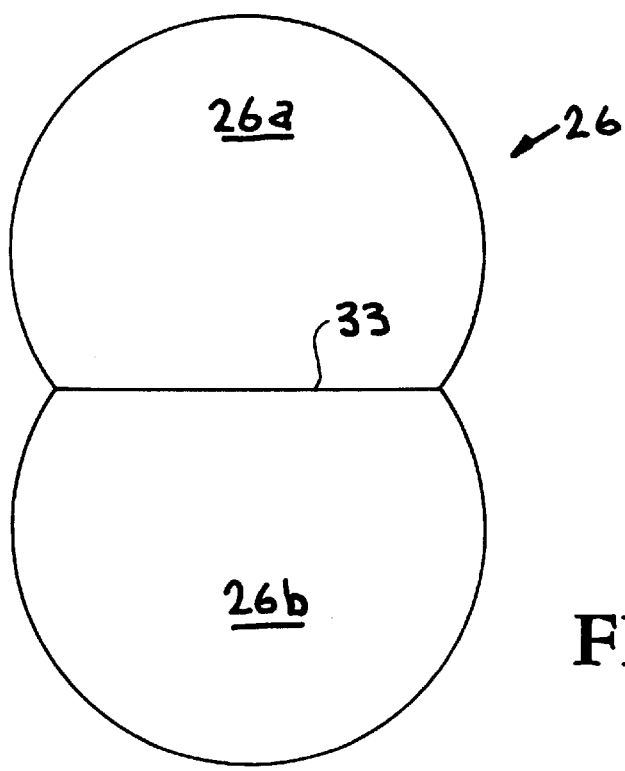
FIG. 3D shows a top view of a combined focusing and partitioning element comprising two plano-convex circular lenses joined along a chord.

Alternatively, the focusing element and partitioning element can be combined in a single physical element. FIG. 3A illustrates one such example comprising a lens 25 with "v" groove 21. The line 27 at the vertex of the "V" splits the spot of the optical beam in half. The lens is made of glass, and may be precision ground. Alternatively the lens is simply molded plastic such as acrylic or polycarbonate. The shape of the "V" can either be a trough 21 as shown in FIG. 3A or a ridge 29 on a lens 31 as shown in FIG. 3B. Another example of a combined partitioning and focusing element comprises a lens 26 comprising two standard plano-convex circular glass lenses, 26a, b joined along a chord 33 as viewed from the top (FIGS. 3C and 3D).

The component photodiode design enables simpler electronic amplification with inherently less electrical noise than the conventional bi-cell. Measurements by the sensor of the pointing noise of a focused helium-neon laser as a function of frequency demonstrate high sensitivity and suitability for optical probe beam deflection experiments.

EXAMPLES

The optical probe beam was separated into two parts by an optical partitioning element and directed to the photodiodes. As FIG. 2 shows, this was achieved by using two mirrors, one with a well-defined straight edge. This edge sharply divided the optical beam, performing the same function as the border between two segments of a conventional monolithic bi-cell. A lens (focal length=35 mm) focused the portions of the beam onto the photodiodes (Hamamatsu model S2386-18K, surface area=1.2 mm²), intensified the incident radiation, and restricted the amount of unwanted stray light that reached the diodes. Noise characteristics were tested by connecting the device directly to the current input channel (gain=$10^6$ V/A) of a Stanford Research Systems Model 830 Lock-in Amplifier. This lock-in amplifier was equipped with an internal algorithm that measured noise as a function of frequency using a mean average deviation (MAD) method.

Figure 4:
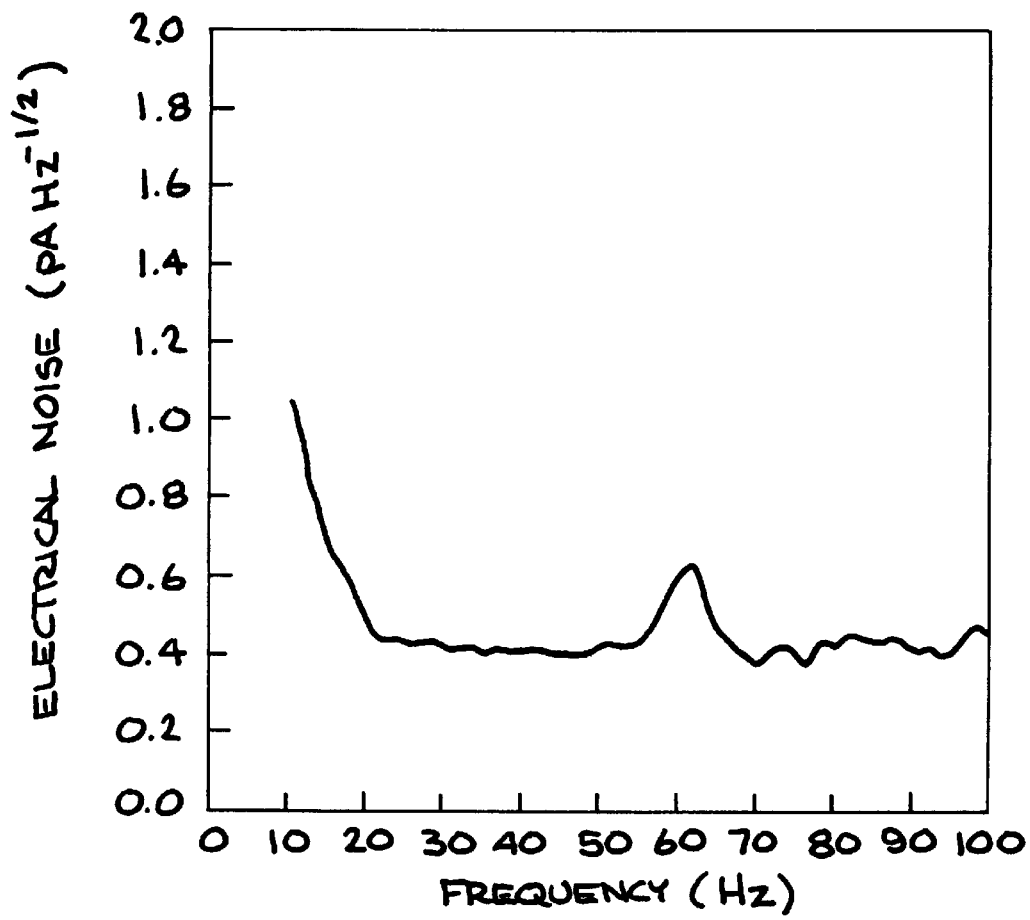
FIG. 4 shows electrical noise as a function of frequency for a current input channel of a lock-in amplifier under dark conditions.

Three conditions were used to measure noise with the detector: First, the photodiodes of the sensor were placed in a dark environment and the current noise was observed by scanning the reference frequency from 10 Hz to 100 Hz and recording data at 2 Hz intervals. This limited frequency range was chosen because of its usefulness in photothermal deflection spectroscopy. The purpose of the initial test was to determine the internal electrical noise of the amplification system, and also to check for other contributions to electrical noise, such as capacitive and inductive coupling, and microphonic noise. The low-pass filter of the lock-in amp was set with a time constant of 100 ms and a 12 dB/octave rolloff, for an effective noise bandwidth of 1.25 Hz. The rms noise, as shown by FIG. 4, was on the order of 0.5 pA/√Hz, which originates primarily from the current preamplifier within the lock-in amplifier.

Figure 5:
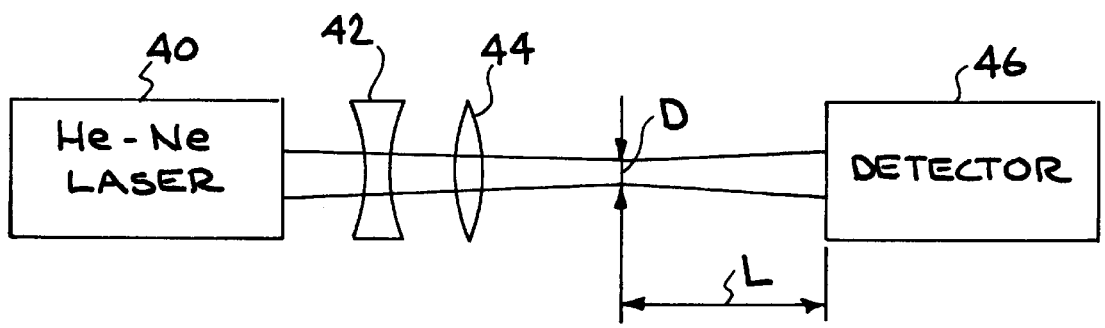
FIG. 5 shows a diagram of one optical arrangement for measuring deflection of an optical probe beam generated by a He-Ne laser.
Figure 6:
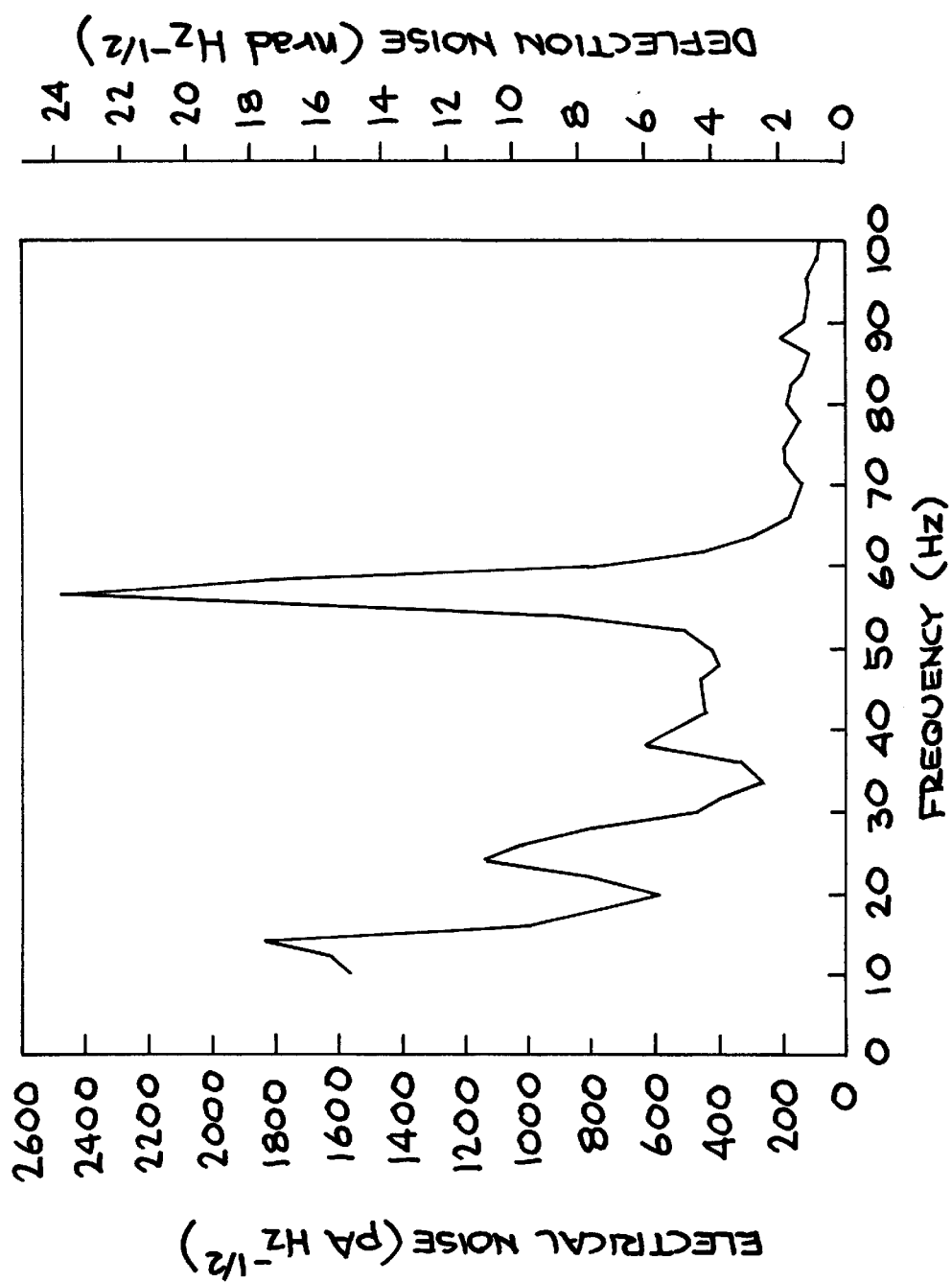
FIG. 6 shows noise as a function of frequency for observation of a probe beam with 2.0 mW optical power using the inventive position sensor.

Next, the detector was used for observing the pointing stability of a focused Uniphase Model-1303P Helium-Neon laser 40. The output power of the laser was equal to 2.0 mW. Through a pair of lenses 42, 44, the beam was focused down to a $1/e^2$ waist diameter D of 50 µm, and the detector was placed at a distance of 16 cm beyond the beam waist. The diameter of the beam at the plane of the detector was equal to 2.6 mm. This arrangement of optical components, shown in FIG. 5, duplicated typical conditions for an optical probe beam deflection experiment. The position sensor 36 was essentially the apparatus described in detail above and shown in FIG. 2. FIG. 6 shows the measured noise in units of electrical current, and also in equivalent units of angular deflection of the optical beam, using the beam waist as the location for the vertex of the angle. This sort of test can be useful for selecting a modulation frequency to provide maximum signal-to-noise ratio in a photothermal deflection experiment. Over the observed frequency domain, the measured deflection noise ranged from about 1 nrad/√Hz to greater than 20 nrad/√Hz. Typical signal amplitudes encountered in photothermal deflection spectroscopy experiments may vary from less than 10 nrad (J. D. Spear and R. E. Russo, J. Appl. Phys. 70:580 1991) to greater than 100 mrad (J. D. Spear, R. E. Russo, and R. J. Silva, Appl. Opt. 29:4225 1990). The features of the curve in FIG. 6 are particular to the optical apparatus used in this experiment, and may be caused by thermal and electrical fluctuations in the laser head, mechanical vibrations of optical components, and air currents. The electrical noise of the system with the addition of the probe beam is more than three orders of magnitude greater than that observed with dark conditions. Therefore, observed noise in this experimental configuration is dominated by actual pointing noise of the probe beam, rather than by electrical noise.

Figure 7:
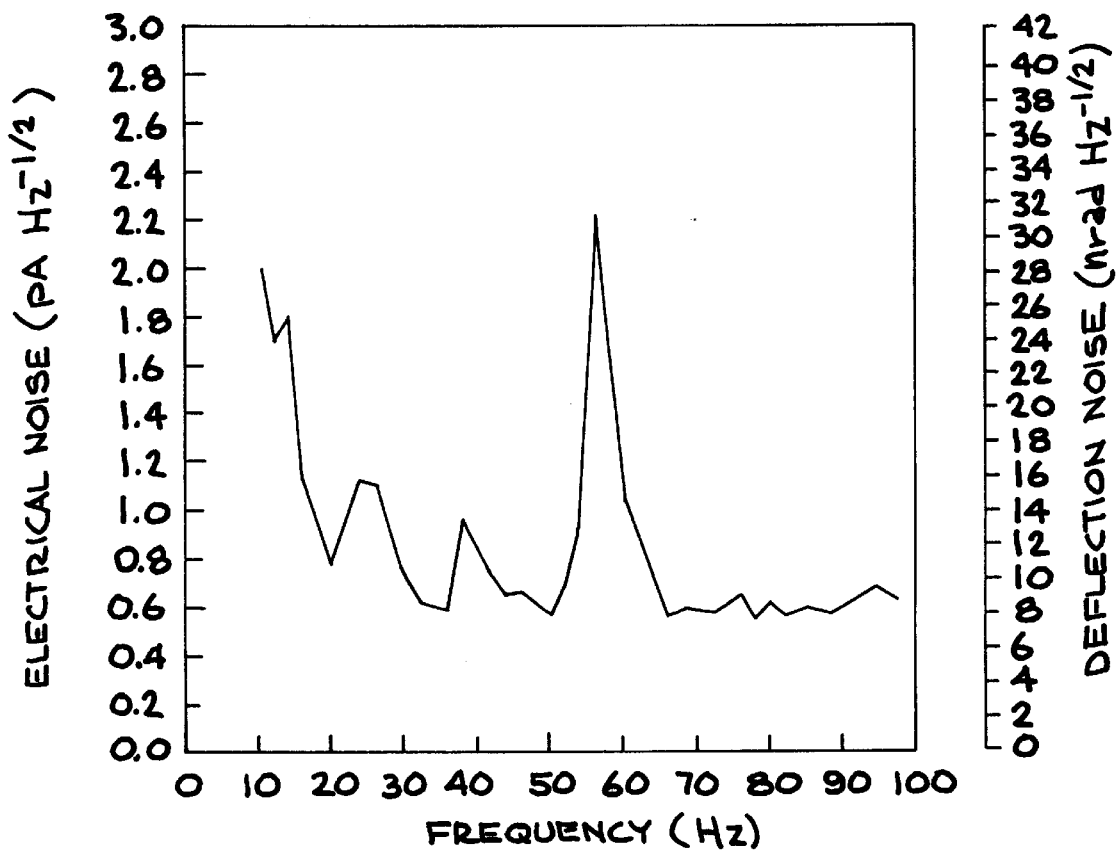
FIG. 7 shows noise as a function of frequency using the inventive position sensor for observation of a probe beam with 1.4 $\mu$W optical power.

Thirdly, an attenuating filter was used to reduce the power of the probe beam down to a level of 1.4 µW and noise was measured as before. The results of this scan are shown in FIG. 7. Again, noise is reported both in electrical units and in angular units. Because the electrical response of the detector was proportional to the power of the probe beam, the conversion factor between the ordinate axes was different from that of the previous figure. At such a low optical power level, electrical noise became comparable to mechanical pointing noise. The shape of the curve shows the distinct features of both of the previous curves, FIGS. 4 and 6. Electrical noise dominated for frequencies greater than 60 Hz.

The inventive, component photodiode sensor, like a conventional bi-cell photodiode sensor, is linear only for deflections that are small compared to the beam spot size.

A conventional bi-cell photodiode sensor (FIG. 1A) and the inventive component photodiode sensor (FIGS. 1B and 2) differ fundamentally in their electrical configuration. With a conventional monolithic bi-cell, the sum of the amplified photocurrents from the separate channels provides an electrical measure of the total power of the optical probe beam. In contrast, the circuit design of the inventive position sensor uses component photodiodes to null the photocurrents before amplification, so this measurement of total power is not readily available. The inventive position sensor uses a separate reference measurement to ensure accuracy of the deflection measurement if the power of the probe beam varies significantly during an experiment. This reference measurement can be made with an optical beam splitter (such as a microscope cover slide) to reflect a small fraction of the probe beam onto another photodetector. Alternatively, a measurement of beam power can be made by adding a second amplifier to the basic electrical circuit shown in FIG. 1B, connecting it so that the grounded end of one of the photodiodes is moved to the input of the second current amplifier instead. However, in such a configuration, the input noise voltage generated by the second amplifier can appear as an additional source of current noise in the primary amplifier, via the terminal capacitance of the photodiode. The main benefits of the inventive component photodiode design is in its capability for effectively reducing thermal noise and its convenience in allowing a single amplifier to convert the nulled photocurrents into a voltage signal.

Another consequence of the inventive component photodiode design is that, unlike the bi-cell, its electrical configuration does not permit a bias potential to be applied conveniently to the photodiodes. A bias potential is used for high frequency measurements, in which the photodiodes operate in the photoconductive, rather than photovoltaic, mode. However, because the optical gain provided by the lens in our design allows the size of each photodiode to be reduced, the terminal capacitance of the detector is decreased, thereby improving bandwidth limitations. The photodiodes used in this experiment were specified by the manufacturer to have a rise time of 0.4 µs when connected individually to an unbiased load of 1 kΩ, which is the impedance of the current input channel of the lock-in amplifier. Because the detector contains a pair of photodiodes connected in parallel, it is expected that the rise time for the detector is twice that of each photodiode, or 0.8 µs, corresponding to a −3 dB frequency bandwidth equal to 200 kHz. The current input channel of the lock-in amp has a specified bandwidth of only 70 kHz, so the amplifier limits speed for this particular experiment. Although this is more than fast enough for most optical probe beam deflection measurements, the bandwidth of our detector system is increased further by using a different current preamplifier and by substituting faster photodiodes. It is readily apparent how to make these substitutions to those who work in the art. Furthermore, noise at low frequencies is often a more important consideration than is response at high frequencies, and the present inventive optical position detector design works for such applications.

Initial tests have shown that the electrical noise obtainable with the detector system is orders of magnitude lower than the equivalent noise contributed by mechanical pointing instabilities of a probe beam in a typical deflection experiment using a conventional optical position sensor. Thus correcting for pointing noise further improves the performance of a beam deflection apparatus in which the component detector design is used. The method of M. J. D. Low and M. Lacroix, (Infrared Phys. 22:139 1982) used for photothermal beam deflection spectroscopy incorporates a 50% beam splitter to reflect half of the power of the probe beam onto a second position sensor. The amplified output of the second position sensor is electrically subtracted from that of the first, so pointing noise common to both sensors is canceled. A comparable system can be constructed with a pair of component photodiode position sensors, and the reduced electrical noise obtainable enhances its effectiveness. With the inventive component photodiode design, the second position sensor is electrically connected in parallel to the first position sensor so that a single amplifier is used for the pair of sensors.

Other methods of stabilizing the probe beam, such as spatial filtering or active feedback control, are also usable. Active feedback control systems for laser beam pointing stabilization incorporate position sensitive detectors to monitor the position and angle of an input laser beam, amplifying the detector signals to drive mirror mounts with piezoelectric transducers [S. Grafstrom, U. Harbarth, J. Kowalski, R. Neumann, and S. Noethe, Opt. Commun. 65:121 (1988); C. W. Siders, E. W. Gaul, M. C. Downer, A. Babine, and A. Stepanov, Rev. Sci. Instrum. 65:3140 (1994) ]. Because internal electrical noise may limit the ultimate performance of these systems, a laser beam pointing stabilizer that incorporates component photodiode devices rather than conventional monolithic position sensitive detectors can be designed using these principles by those skilled in the art.

Figure 1C:
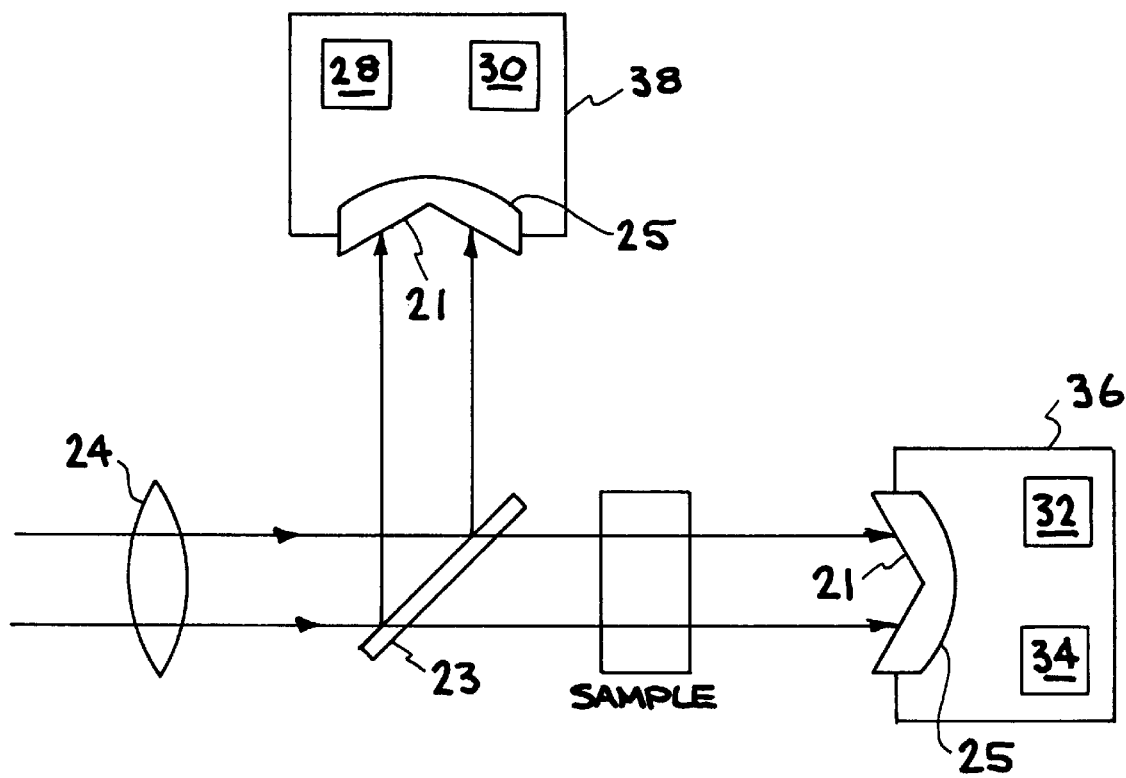
FIG. 1C shows a scheme for electronic correction of pointing noise of the optical beam generated by a laser.
Figure 1D:
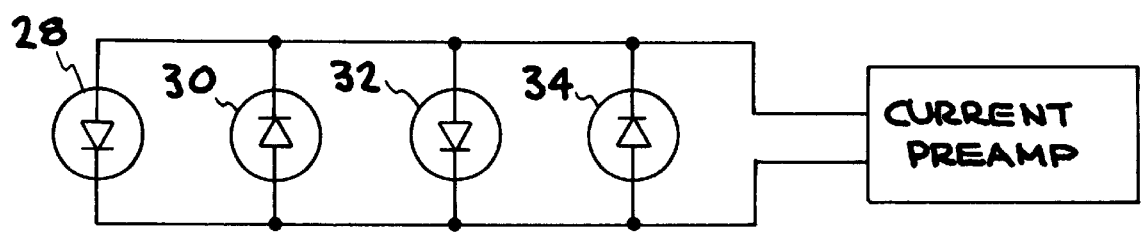
FIG. 1D shows the photodiode wiring scheme for FIG. 1C.

Deflection measurements with source noise correction are made with an optical beam splitter 23 and two component photodiode detectors 36, 38, each with an amplifier (FIG. 1C). To measure beam deflection and correct for source noise, essentially a pair of inventive position sensors are used, a reference detector 38 and a sample detector 36, comprising four photodiodes, wired in parallel, with photodiodes 28 and 32 having opposite polarity from photodiodes 30 and 34. The detectors use lenses 25 with grooves 21 as shown in FIG. 3A. To balance the signals and align the beam, the sample detector 36 and the reference detector 38 are located so that each yields zero net current when the other is blocked from light. Then the intensity of light impinging on the reference and sample detectors is balanced so that a perturbation of the optical beam does not result in a current perturbation, for example by rotating the head of a HeNe laser if it is polarized, or by placing a variable density filter between the beam splitter and the reference detector. FIG. 1C does not illustrate the circuit connections shown in FIG. 1B, but photodiodes 28 and 30, and 32, 34 are connected as shown in FIG. 1D.

As electrical noise is reduced, the optical power of the probe beam can be reduced without adversely affecting the performance of the system. A low noise detector enables some deflection measurements to be performed on an optical beam that does not originate from a coherent laser source. Also, using a probe beam of low power is particularly desirable for certain measurements, such as sensitive photothermal experiments like those described by J. R. Barnes, R. J. Stephenson, M. E. Welland, Ch. Gerber, & J. K. Gimzewski, in Nature 372:79 1994 or other temperature controlled studies in which absorption of probe beam radiation by the sample can cause unwanted photothermal effects.

Figure 8:
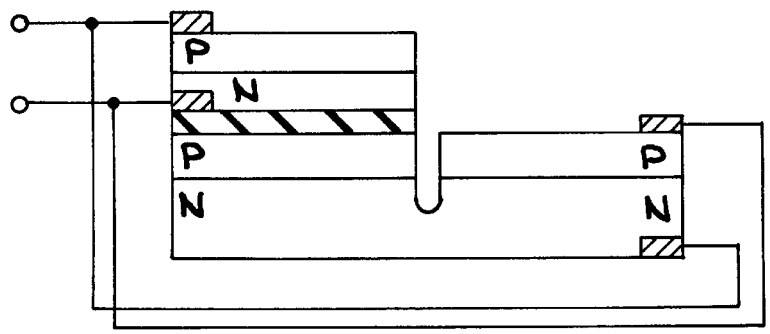
FIG. 8 shows a schematic diagram of a monolithic version of the inventive optical position sensor.

The inventive optical position sensor can also be manufactured in an integrated circuit (FIG. 8). In that case, the sensor is useful even without an optical partitioning device. For some applications it is not necessary to use a focusing element for a monolithic construction of the inventive detector. The illustration in FIG. 8 does not show the electrical leads connected to an op-amp. The op-amp and feedback resistor are either constructed as part of the monolithic device or as component elements. In either case it is electrically connected as shown in FIG. 1B.

Alternatively, the inventive optical position sensor can be manufactured in a integrated circuit by fabricating a photdiode on a wafer in the conventional manner, then etching or cutting through the photodiode thus creating two neighboring individual photodiodes. Additional circuitry is fabricated as needed around the two photodiodes, which are connected electrically as described above.

In summary, the invention provides a novel optical position sensor that reduces electrical noise to signal ratio in a circuit detecting the position of an optical beam and/or fluctuations within an optical beam.

The description of illustrative embodiments and best modes of the present invention is not intended to limit the scope of the invention. Various modifications, alternative constructions and equivalents may be employed without departing from the true spirit and scope of the appended claims.

The invention having thus been described, what is claimed is:

1. An optoelectronic sensor, comprising:
    a) two component photodiodes connected electrically in parallel with opposing polarities, each having an anode and a cathode, a first of the photodiodes having its anode electrically connected to the cathode of a second photodiode and its cathode electrically connected to the anode of the second photodiode;
    b) a partitioning element to separate an incident optical beam into at least two of its spatially separated components, a first component incident on one photodiode and a second component incident on a second photodiode; and
    c) at least one focusing element, located so as to concentrate each of the at least two beam components on the two photodiodes.

2. The apparatus of claim 1 wherein each of the two component photodiodes have detecting surfaces between about 0.2 mm$^2$ and about 100 mm$^2$.

3. The apparatus of claim 2 wherein each of the two component photodiodes have detecting surfaces between about 0.6 m$^2$ and about 30 mm$^2$.

4. The apparatus of claim 3 wherein each of the two component photodiodes have detecting surfaces between about 0.9 mm$^2$ and about 10 mm$^2$.

5. The apparatus of claim 1 wherein the focusing element has a focal length of between about 3 mm and 200 mm.

6. The apparatus of claim 5 wherein the focusing element has a focal length of between about 9 mm and 150 mm.

7. The apparatus of claim 5 wherein the focusing element has a focal length of between about 1 meter and about 50 meters.

8. The apparatus of claim 1 wherein the focusing element is a lens.

9. The apparatus of claim 1 wherein the focusing element is a concave mirror.

10. The apparatus of claim 1 wherein the partitioning element comprises a pair of spatially offset mirrored surfaces.

11. The apparatus of claim 1 wherein the focusing element and partitioning element are combined.

12. The apparatus of claim 11 wherein the combined focusing and partitioning element comprises a lens having one convex face and one wedge-shaped face.

13. The apparatus of claim 11 wherein the combined focusing and partitioning element comprises a lens having one convex face and one face with a "v" groove.

14. The apparatus of claim 11 wherein the combined focusing and partitioning element comprises two lenses each having a convex surface and joined at a common border.

15. The apparatus of claim 11 wherein the combined focusing and partitioning element comprises a single piece of lens material formed into two lenses joined at a common border.

16. An optoelectronic sensor, comprising:
    a) two component photodiodes connected electrically in parallel with opposing polarities, each having an anode and a cathode, a first of the photodiodes having its anode electrically connected to the cathode of a second photodiode and its cathode electrically connected to the anode of the second photodiode;
    b) an op-amp having its negative terminal connected to the cathode of one of the photodiodes and its positive terminal connected to the anode of the same photodiode;

c) a feedback resistor having two terminals, one resistor terminal connected to an output terminal of the op-amp and a second resistor terminal connected to an input terminal of the op-amp;

d) a partitioning element to separate an incident optical beam into at least two of its spatially separated components, a first component incident on one photodiode and a second component incident on a second photodiode; and e) at least one focusing element, located so as to concentrate each of the at least two beam components on the two photodiodes.

* * * * *

UNITED STATES PATENT AND TRADEMARK OFFICE
Certificate

Patent No. 5,880,461                                                      Patented: March 9, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jonathan David Spear, Berkeley, CA; and Richard E. Russo, Walnut Creek, CA.

Signed and Sealed this Fourth Day of March 2003.

DAVID P. PORTA
*Supervisory Patent Examiner*
Art Unit 2878